G. R. PIERCE.
Spoon-Hook for Fishing.
No. 167,784. Patented Sept. 14, 1875.
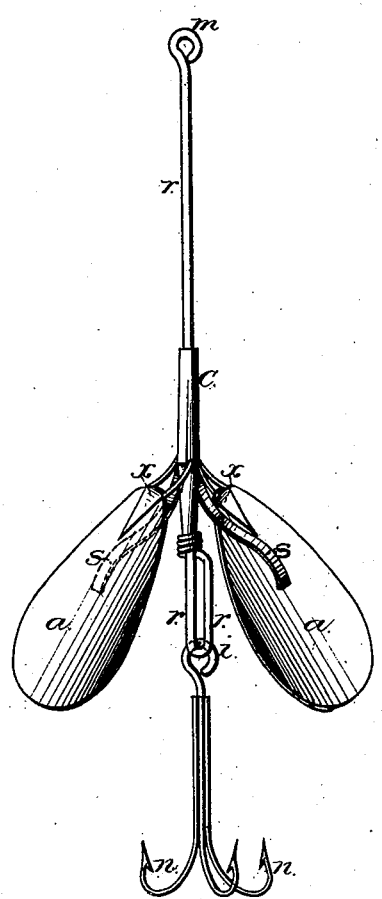
Witnesses:
Edwin A Burley
Frank G Rose
Inventor:
Geo R Pierce

UNITED STATES PATENT OFFICE.

GEORGE R. PIERCE, OF GRAND RAPIDS, MICHIGAN.

IMPROVEMENT IN SPOON-HOOKS FOR FISHING.

Specification forming part of Letters Patent No. 167,784, dated September 14, 1875; application filed February 23, 1875.

*To all whom it may concern:*

Be it known that I, GEORGE R. PIERCE, of the city of Grand Rapids, Kent county, Michigan, have invented a Spoon-Hook for Fishing, of which the following is a specification:

My invention relates to the construction of a spoon-hook for fishing, composed of rod $r$, upon which revolves and slides sleeve $c$, to which sleeve are attached, by means of hinges $x$, two spoons, $a$, exactly opposite each other, the position of the spoons $a$ to be controlled somewhat by means of two springs, $s$, also attached to sleeve $c$.

The advantages of this style of spoon-hooks over others are that the sleeve $c$ readily moves up and down on rod $r$, so that, when passing through the water, the spoons $a$ are brought by action of the water back in close proximity to the hooks, thereby shielding hook from grasses and foreign substances that might otherwise obstruct the same, which also places the spoons which attract the fish near to the hook, so that when the fish attempts to seize the spoon he must seize the hook, and the full length of the same, for should the fish seize both spoons in his mouth the springs will allow the spoons to shut close together against the wire, leaving the hook fully exposed. If the fish strike between the spoons the sleeve to which the spoons are attached readily passes to the extreme end $m$ of rod $r$, and the spoons, by means of the hinges $x$, may invert their position and lie with convex sides close together against $m$ end of rod $r$, thereby being entirely, and at the proper moment, removed from obstructing the action of the hook. Should the fish seize one spoon in its mouth and not the other, the one seized will be pressed down with concave side against the rod, leaving the hook free, while the other may be inverted as before described. When caught with hook the fish will invariably endeavor to eject the hook from its mouth. In so doing the sleeve to which the spoons are attached readily sliding upon the rod, the spoons are ejected from the mouth without being bruised or broken, while the hooks hold fast to the fish. With this construction the action of the water causes sleeve and spoons to revolve with great velocity in the water, and will, with the same motion, run from one to three feet higher than other hooks.

What I claim as my invention, and desire to secure by Letters Patent, is—

The above-described spoon-hook, having, in combination with rod $r$ and hooks $n$, the sliding and revolving sleeve $c$, with two spoons directly opposite each other, attached thereto by hinges $x$, supported by springs $s$, substantially as and for purpose set forth.

GEO. R. PIERCE.

Witnesses:
EDWIN A. BURLINGAME,
FRANK G. ROSA.